United States Patent
Yamaguchi et al.

(10) Patent No.: US 10,253,179 B2
(45) Date of Patent: Apr. 9, 2019

(54) POLYPHENYLENE ETHER RESIN COMPOSITION AND MOLDED ARTICLE AND METHOD FOR PRODUCING POLYPHENYLENE ETHER RESIN COMPOSITION

(71) Applicant: ASAHI KASEI KABUSHIKI KAISHA, Chiyoda-ku, Tokyo (JP)

(72) Inventors: Toru Yamaguchi, Tokyo (JP); Masahito Kuramitsu, Tokyo (JP); Hiroshi Oyamada, Tokyo (JP)

(73) Assignee: ASAHI KASEI KABUSHIKI KAISHA, Chiyoda-ku, Tokyo (JP)

( * ) Notice: Subject to any disclaimer, the term of this patent is extended or adjusted under 35 U.S.C. 154(b) by 75 days.

(21) Appl. No.: 15/281,938

(22) Filed: Sep. 30, 2016

(65) Prior Publication Data

US 2018/0094134 A1    Apr. 5, 2018

(51) Int. Cl.
*C08L 71/12* (2006.01)

(52) U.S. Cl.
CPC ......... *C08L 71/123* (2013.01); *C08L 2201/02* (2013.01)

(58) Field of Classification Search
CPC ........................... C08L 71/123; C08L 2201/02
USPC ............................................................. 524/96
See application file for complete search history.

(56) References Cited

U.S. PATENT DOCUMENTS

| | | | |
|---|---|---|---|
| 6,306,941 B1 | 10/2001 | Klatt et al. | |
| 6,359,043 B1* | 3/2002 | Gijzen | C08L 71/123 524/127 |
| 7,091,266 B2* | 8/2006 | Murakami | C08K 5/5399 524/116 |
| 7,282,534 B2* | 10/2007 | Sakuma | C08G 65/44 524/508 |

FOREIGN PATENT DOCUMENTS

| | | | |
|---|---|---|---|
| JP | 07179694 A | * | 7/1995 |
| JP | H08183902 A | | 7/1996 |
| JP | H10168260 A | | 6/1998 |
| JP | 2001500182 A | | 1/2001 |
| JP | 2010189618 A | * | 9/2010 |
| JP | 2015209518 A | | 11/2015 |

OTHER PUBLICATIONS

JP 07-179694 A, machine translation, JPO Japan Platform for Patent Information (J-PlatPat). (Year: 1995).*
JP 2010-189618 A, machine translation, JPO Japan Platform for Patent Information (J-PlatPat). (Year: 2010).*

* cited by examiner

*Primary Examiner* — Josephine L Chang
(74) *Attorney, Agent, or Firm* — Kenja IP Law PC

(57) ABSTRACT

Provided is a polyphenylene ether resin composition having excellent mechanical properties, such as tensile, flexural, and impact strength, high flame retardance, and adequate molding fluidity, and that is sufficiently resistant to use as a thin molded article for an electric/electronic device cooling fan, etc. The polyphenylene ether resin composition contains at least 90 mass % of a polyphenylene ether (A), a styrene resin (B), glass fiber (C), and an organophosphorus flame retardant (D) in terms of total mass of (A) to (D). Taking this total mass as 100 mass %, contents of the polyphenylene ether (A), styrene resin (B), glass fiber (C), and organophosphorus flame retardant (D) are 25-75 mass %, 0-5 mass %, 20-50 mass %, and 5-20 mass %, respectively, and taking mass of the organophosphorus flame retardant (D) as 100 mass %, content of at least one compound selected from the group consisting of triphenyl phosphate and a phosphazene is at least 70 mass %.

11 Claims, No Drawings

POLYPHENYLENE ETHER RESIN COMPOSITION AND MOLDED ARTICLE AND METHOD FOR PRODUCING POLYPHENYLENE ETHER RESIN COMPOSITION

TECHNICAL FIELD

The present disclosure relates to a polyphenylene ether resin composition and molded article, and to a method for producing a polyphenylene ether resin composition.

BACKGROUND

A polyphenylene ether resin is normally formed by blending a polyphenylene ether and a styrene resin in proportions that are dependent on the levels of heat resistance and molding fluidity that are required. The polyphenylene ether resin may be further blended with an elastomer component and additive components such as a flame retardant, an organic filler, and a heat stabilizer as necessary in order to form a polyphenylene ether resin composition.

Polyphenylene ether resins have excellent heat resistance, mechanical properties, molding processability, acid and alkali resistance, dimensional stability, electrical properties, and so forth, and are thus widely used in fields such as consumer electronics, office automation, office equipment, information devices, and automobiles. Among such applications, in the case of cooling fans (propellers) and the like in electric and electronic devices such as consumer electronics, office automation, office equipment, and information devices such as PCs, there has been demand in recent years for extremely high mechanical properties such as heat resistance, flexural strength, and tensile strength in use as a thin molded article, and there has also often been demand for durability in order to enable long-term resistance to stress even under high-temperature conditions. Consequently, there is ongoing investigation of polyphenylene ether resin compositions that contain a large amount of an inorganic filler, and in particular glass fiber.

On the other hand, in recent years it has often been the case in applications such as described above that extremely high levels of flame retardance have been required that have not been conventionally achievable. It is known that in the case of a polyphenylene ether resin composition in which a large amount of an inorganic filler such as glass fiber is blended with a polyphenylene ether resin, flame retardance can be improved to a certain extent by further blending a flame retardant (for example, refer to PTL 1 and 2). However, it also known that since a fibrous inorganic filler has a wick effect, it is extremely difficult to increase the flame retardance of a resin composition containing a large amount of glass fiber to a high level through blending of a flame retardant, and once a certain level of flame retardance is reached, flame retardance cannot be further increased simply by further increasing the amount of the flame retardant (for example, refer to PTL 3).

CITATION LIST

Patent Literature

PTL 1: JP H8-183902 A
PTL 2: JP H10-168260 A
PTL 3: JP 2001-500182 A

SUMMARY

As described above, it is extremely difficult to increase the flame retardance of a resin composition containing a large amount of glass fiber to a high level through blending of a flame retardant, and once a certain level of flame retardance is reached, flame retardance cannot be further increased simply by further increasing the amount of the flame retardant. Furthermore, blending of a large amount of a flame retardant may lead to a significant decrease in mechanical properties such as tensile strength and flexural strength even though a large amount of glass fiber has been blended in order to improve these properties. Ultimately, it is difficult to obtain a material having a desired performance balance and it is not possible to realize such a balance with known polyphenylene ether resin compositions.

Accordingly, one objective of the present disclosure is to provide a polyphenylene ether resin composition having excellent mechanical properties, such as tensile strength, flexural strength, and impact strength, a high level of flame retardance, and adequate molding fluidity, and that is sufficiently resistant to use as a thin molded article for a cooling fan or the like of an electric or electronic device. Another objective of the present disclosure is to provide a molded article formed from the aforementioned polyphenylene ether resin composition. Yet another objective of the present disclosure is to provide a method for producing the aforementioned polyphenylene ether resin composition.

The inventors conducted diligent investigation in order to develop a polyphenylene ether resin composition having mechanical properties such as tensile strength, flexural strength, and impact strength, a high level of flame retardance, and adequate molding fluidity. As a result of this investigation, the inventors discovered that a polyphenylene ether resin composition that has a balance of good mechanical properties and a high level of flame retardance that has not been conventionally achieved, and that can be effectively used for applications such as cooling fans of electric and electronic devices, can be obtained through inclusion of from 20 mass % to 50 mass % of glass fiber as an inorganic filler, inclusion of a styrene resin with a content adjusted to be no greater than 5 mass %, and further blending of a prescribed flame retardant in order to increase flame retardance. This discovery led to the present disclosure.

Specifically, the present disclosure provides:

(1) A polyphenylene ether resin composition comprising at least 90 mass % of a polyphenylene ether (A), a styrene resin (B), glass fiber (C), and an organophosphorus flame retardant (D) in terms of a total mass of (A) to (D), wherein when the total mass of (A) to (D) is taken to be 100 mass %, content of the polyphenylene ether (A) is from 25 mass % to 75 mass %, content of the styrene resin (B) is from 0 mass % to 5 mass %, content of the glass fiber (C) is from 20 mass % to 50 mass %, and content of the organophosphorus flame retardant (D) is from 5 mass % to 20 mass %, and when a mass of the organophosphorus flame retardant (D) is taken to be 100 mass %, content of at least one compound selected from the group consisting of triphenyl phosphate and a phosphazene is at least 70 mass %.

(2) The polyphenylene ether resin composition described in (1) having a tensile strength of at least 130 MPa as measured at 23° C. in accordance with ISO 527.

(3) The polyphenylene ether resin composition described in (1) or (2) having a flame retardance level of V-0 as measured in accordance with UL 94 using a strip specimen of 0.8 mm in thickness.

(4) The polyphenylene ether resin composition described in any one of (1) to (3) having a flexural strength of at least 170 MPa as measured at 23° C. in accordance with ISO 178.

(5) The polyphenylene ether resin composition described in any one of (1) to (4) having a high-temperature tensile strength of at least 70 MPa as measured at 110° C. in accordance with ISO 527.

(6) The polyphenylene ether resin composition described in any one of (1) to (5), wherein the organophosphorus flame retardant (D) is a mixture of an aromatic phosphoric acid ester and a phosphazene and, when a mass of the organophosphorus flame retardant (D) is taken to be 100 mass %, content of the phosphazene is from 70 mass % to 95 mass %.

(7) The polyphenylene ether resin composition described in any one of (1) to (6), wherein the organophosphorus flame retardant (D) is triphenyl phosphate and, when the total mass of (A) to (D) is taken to be 100 mass %, content of the triphenyl phosphate is from 5 mass % to 13 mass %.

(8) The polyphenylene ether resin composition described in any one of (1) to (7), wherein the organophosphorus flame retardant (D) is a phosphazene.

(9) The polyphenylene ether resin composition described in any one of (1) to (8), wherein the styrene resin (B) is not included.

(10) A method for producing the polyphenylene ether resin composition described in any one of (1) to (9), comprising: obtaining a blended product by pre-blending the organophosphorus flame retardant (D) and the polyphenylene ether (A) in a ratio (D)/(A) of from 1/1 to 1/7; and kneading the blended product and the glass fiber (C).

(11) A cooling fan for an electric or electronic device comprising the polyphenylene ether resin composition described in any one of (1) to (9).

Through the presently disclosed polyphenylene ether resin composition, it is possible to provide a polyphenylene ether resin composition having excellent flame retardance, molding fluidity, and mechanical properties such as tensile strength, flexural strength, and impact strength. The polyphenylene ether resin composition can be particularly effectively used as a thin molded article for a cooling fan or the like of an electric or electronic device. Moreover, the presently disclosed molded article enables the effects of the presently disclosed polyphenylene ether resin composition to be obtained. Furthermore, the presently disclosed method for a producing a polyphenylene ether resin composition enables production of the presently disclosed polyphenylene ether resin composition.

DETAILED DESCRIPTION

An embodiment of the present disclosure (hereinafter referred to as "the present embodiment") is described in detail below. However, the present disclosure is not limited by the following description and may be implemented with various alterations that do not deviate from the essence thereof.

(Resin Composition)

A resin composition of the present embodiment is a polyphenylene ether resin composition containing at least 90 mass % of a polyphenylene ether (A), a styrene resin (B), glass fiber (C), and an organophosphorus flame retardant (D) in terms of the total mass of (A) to (D). However, from a viewpoint of sufficiently obtaining the effects disclosed herein, the percentage mentioned above is preferably at least 95 mass %, and more preferably at least 98 mass %.

The resin composition of the present embodiment is a polyphenylene ether resin composition in which, when the total mass of the polyphenylene ether (A), the styrene resin (B), the glass fiber (C), and the organophosphorus flame retardant (D) is taken to be 100 mass %, content of the polyphenylene ether (A) is from 25 mass % to 75 mass %, content of the styrene resin (B) is from 0 mass % to 5 mass %, content of the glass fiber (C) is from 20 mass % to 50 mass %, and content of the organophosphorus flame retardant (D) is from 5 mass % to 20 mass %. Moreover, when the mass of the organophosphorus flame retardant (D) in the resin composition of the present embodiment is taken to be 100 mass %, content of at least one compound selected from the group consisting of triphenyl phosphate and a phosphazene is at least 70 mass %.

—Polyphenylene Ether (A)—

The polyphenylene ether (A) preferably includes either or both of a repeating unit represented by general formula (1) shown below and a repeating unit represented by general formula (2) shown below, and is preferably a homopolymer formed by constitutional units represented by general formula (1) or (2) or a copolymer including constitutional units represented by formula (1) or (2).

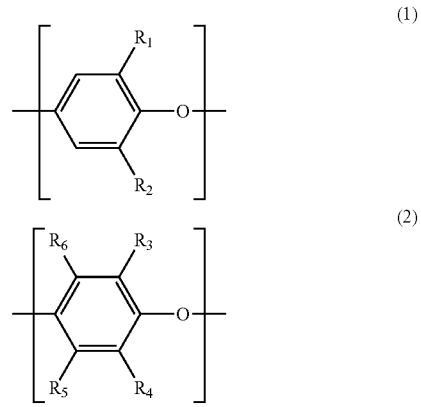

(In general formulae (1) and (2), $R_1$, $R_2$, $R_3$, $R_4$, $R_5$, and $R_6$ each represent, independently of one another, a group selected from the group consisting of an alkyl group having a carbon number of 1-4, an aryl group having a carbon number of 6-12, and other monovalent groups such as halogens and hydrogen, but $R_5$ and $R_6$ do not both represent hydrogen.)

Note that among such other monovalent groups, hydrogen is preferable. A hydrogen atom of the aforementioned alkyl group or aryl group may be substituted by a halogen, a hydroxy group, or an alkoxy group. Furthermore, the carbon number of the alkyl group is preferably 1-3 and the carbon number of the aryl group is preferably 6-8.

It should be noted that the number of repetitions of the repeating units in general formulae (1) and (2) may vary depending on the molecular weight distribution of the polyphenylene ether (A) and is not specifically limited.

Examples of homopolymers that can be used as the polyphenylene ether (A) include, but are not limited to, poly(2,6-dimethyl-1,4-phenylene) ether, poly(2-methyl-6-ethyl-1,4-phenylene) ether, poly(2,6-diethyl-1,4-phenylene) ether, poly(2-ethyl-6-n-propyl-1,4-phenylene) ether, poly(2,6-di-n-propyl-1,4-phenylene) ether, poly(2-methyl-6-n-butyl-1,4-phenylene) ether, poly(2-ethyl-6-isopropyl-1,4-phenylene) ether, poly(2-methyl-6-chloroethyl-1,4-phenylene) ether, poly(2-methyl-6-hydroxyethyl-1,4-phenylene) ether, and poly(2-methyl-6-chloroethyl-1,4-phenylene) ether. In particular, poly(2,6-dimethyl-1,4-phenylene) ether is preferable from a viewpoint of processability and ease of raw material acquisition.

Examples of copolymers that can be used as the polyphenylene ether (A) include, but are not limited to, copolymers having a polyphenylene ether structure as a main part thereof such as a copolymer of 2,6-dimethylphenol and 2,3,6-trimethylphenol, a copolymer of 2,6-dimethylphenol and o-cresol, and a copolymer of 2,3,6-trimethylphenol and o-cresol. In particular, a copolymer of 2,6-dimethylphenol and 2,3,6-trimethylphenol is preferable from a viewpoint of processability and ease of raw material acquisition, and a copolymer of 2,6-dimethylphenol and 2,3,6-trimethylphenol (particularly a copolymer in which content of 2,6-dimethylphenol parts is from 70 mass % to 90 mass % and content of 2,3,6-trimethylphenol parts is from 10 mass % to 30 mass %) is more preferable from a viewpoint of enhancing physical properties.

One type of polyphenylene ether (A) such as described above may be used individually, or two or more types of polyphenylene ethers (A) such as described above may be used together.

The polyphenylene ether (A) may be inclusive of a polyphenylene ether containing various phenylene ether units other than those in the aforementioned general formulae (1) and (2) as a partial structure thereof, so long as the heat resistance of the resin composition is not reduced too much. Examples of such phenylene ether units include, but are not limited to, a 2-(dialkylaminomethyl)-6-methylphenylene ether unit and a 2-(N-alkyl-N-phenylaminomethyl)-6-methylphenylene ether unit, which are for example described in JP H01-297428 A and JP S63-301222 A.

The polyphenylene ether (A) may have diphenoquinone or the like bonded into the main chain of the polyphenylene ether.

Furthermore, the polyphenylene ether (A) may have a configuration in which part or all of the polyphenylene ether is replaced by a functionalized polyphenylene ether through reaction (modification) with a functionalizing agent having an acyl functional group and at least one functional group selected from the group consisting of a carboxylic acid, an acid anhydride, an acid amide, an imide, an amine, an orthoester, a hydroxy, and a carboxylic acid ammonium salt.

A ratio (Mw/Mn value) of the weight average molecular weight Mw of the polyphenylene ether (A) and the number average molecular weight Mn of the polyphenylene ether (A) is preferably at least 2.0, more preferably at least 2.5, and even more preferably at least 3.0 from a viewpoint of molding processability of the resin composition, and is preferably no greater than 5.5, more preferably no greater than 4.5, and even more preferably no greater than 4.5 from a viewpoint of mechanical properties of the resin composition. The weight average molecular weight Mw and the number average molecular weight Mn can be obtained from polystyrene-converted molecular weight measured by GPC (gel permeation chromatography).

The reduced viscosity of the polyphenylene ether (A) is preferably at least 0.25 dL/g, more preferably at least 0.30 dL/g, and even more preferably at least 0.33 dL/g from a viewpoint of obtaining adequate mechanical properties, and is preferably no greater than 0.65 dL/g, more preferably no greater than 0.55 dL/g, and even more preferably no greater than 0.42 dL/g from a viewpoint of molding processability. The reduced viscosity can be measured using a Ubbelohde viscometer at 30° C. with a chloroform solvent and a 0.5 g/dL solution.

The content of the polyphenylene ether (A) among a total mass of 100 mass % of the polyphenylene ether (A), the styrene resin (B), the glass fiber (C), and the organophosphorus flame retardant (D) is preferably at least 25 mass %, more preferably at least 35 mass %, and even more preferably at least 40 mass % from a viewpoint of imparting adequate heat resistance and flame retardance, and is preferably no greater than 75 mass %, more preferably no greater than 60 mass %, and even more preferably no greater than 55 mass % from a viewpoint of molding processability.

—Styrene Resin (B)—

In the resin composition of the present embodiment, the styrene resin (B) is a polymer obtained by polymerizing a styrene compound either with or without a rubbery polymer present or is a copolymer obtained by copolymerizing a styrene compound and a compound copolymerizable therewith either with or without a rubbery polymer present.

The term "styrene compound" refers to a compound in which one or more hydrogen atoms of styrene may be substituted with monovalent groups.

Examples of the styrene compound include, but are not limited to, styrene, α-methyl styrene, 2,4-dimethylstyrene, monochlorostyrene, p-methylstyrene, p-tert-butylstyrene, and ethylstyrene. In particular, styrene is preferable from a viewpoint of ease of acquisition of raw material of reliable quality and balance of properties of the composition.

Examples of the compound that is copolymerizable with the styrene compound include, but are not limited to, methacrylic acid esters such as methyl methacrylate and ethyl methacrylate; unsaturated nitrile compounds such as acrylonitrile and methacrylonitrile; and unsaturated acid anhydrides such as maleic anhydride.

Note that among the styrene resins described above, a polymer or copolymer obtained by polymerization or copolymerization with a rubbery polymer present is referred to as a rubber-reinforced styrene resin and a polymer or copolymer obtained by polymerization or copolymerization without a rubbery polymer present is referred to as a non-rubber-reinforced styrene resin.

From a viewpoint of molded article mechanical properties, it is preferable that the styrene resin (B) used herein is a non-rubber-reinforced styrene resin.

It is preferable that the resin composition of the present embodiment contains the styrene resin (B) from a viewpoint of enhancing molding fluidity. However, the content of the styrene resin (B) among a total mass of 100 mass % of the polyphenylene ether (A), the styrene resin (B), the glass fiber (C), and the organophosphorus flame retardant (D) is preferably no greater than 5 mass %, and more preferably no greater than 3 mass % from a viewpoint of imparting adequate heat resistance and flame retardance.

—Glass Fiber (C)—

The glass fiber (C) is blended into the resin composition of the present embodiment with the objective of improving mechanical strength.

The type of glass forming the glass fiber (C) may for example be a commonly known type of glass such as E glass, C glass, S glass, or A glass. The glass fiber (C) is glass in a fibrous form and is differentiated from bulky glass flakes and glass powder.

The average fiber diameter of the glass fiber (C) is preferably at least 5 μm, and more preferably at least 7 μm from a viewpoint of production stability and reduction of molded article rigidity, heat resistance, impact resistance, durability, and the like due to fiber damage during extrusion or molding, and is preferably no greater than 15 μm, and more preferably no greater than 13 μm from a viewpoint of imparting adequate mechanical properties and maintaining molded article surface external appearance.

From a viewpoint of ease of handling, the average length of the glass fiber (C) is preferably at least 0.5 mm, and more preferably at least 1 mm, and is preferably no greater than 10 mm, and more preferably no greater than 6 mm.

Moreover, from a viewpoint of balance between rigidity, durability, molding processability, and molded external appearance, an average L/D ratio (ratio of length and fiber diameter) of the glass fiber (C) is preferably at least 70, more preferably at least 100, and most preferably at least 200, and is preferably no greater than 1,200, more preferably no greater than 1,000, and most preferably no greater than 800.

The glass fiber (C) used in the present embodiment may have been surface treated with a surface treatment agent such as a silane compound. The silane compound used in the surface treatment is a silane compound that is normally used in surface treatment of glass fillers, mineral fillers, and the like. Specific examples of the silane compound include vinylsilane compounds such as vinyltrichlorosilane, vinyltriethoxysilane, and γ-methacryloxypropyltrimethoxysilane; epoxysilane compounds such as γ-glycidoxypropyltrimethoxysilane; sulfur-containing silane compounds such as bis(3-triethoxysilylpropyl)tetrasulfide; mercaptosilane compounds such as γ-mercaptopropyltrimethoxysilane; and aminosilane compounds such as γ-aminopropyltriethoxysilane and γ-ureidopropyltriethoxysilane. Aminosilane compounds are particularly preferable from a viewpoint of achieving the objectives of the present disclosure. One of such silane compounds may be used individually, or two or more of such silane compounds may be used together. A silane compound such as described above may be pre-mixed with a sizing agent such as an epoxy sizing agent or a urethane sizing agent, and the resultant mixture may be used in surface treatment.

The content of the glass fiber (C) among a total mass of 100 mass % of the polyphenylene ether (A), the styrene resin (B), the glass fiber (C), and the organophosphorus flame retardant (D) is preferably at least 20 mass %, and more preferably at least 30 mass % from a viewpoint of enhancing mechanical properties of the resin composition, and is preferably no greater than 50 mass %, and more preferably no greater than 45 mass % from a viewpoint of providing the resin composition with flame retardance.

—Organophosphorus Flame Retardant (D)—

The organophosphorus flame retardant (D) used in the resin composition of the present embodiment is a flame retardant formed by a phosphorus-containing organic compound. Note that a flame retardant formed by a phosphorus-containing inorganic compound and a flame retardant formed by a salt of an organophosphoric acid and a metal do not fall within the scope of the organophosphorus flame retardant (D).

The content of the organophosphorus flame retardant (D) among a total mass of 100 mass % of the polyphenylene ether (A), the styrene resin (B), the glass fiber (C), and the organophosphorus flame retardant (D) is preferably at least 5 mass %, and more preferably at least 7 mass % from a viewpoint of improving flame retardance of the resin composition, and is preferably no greater than 20 mass %, and more preferably no greater than 16 mass % from a viewpoint of maintaining heat resistance.

In the resin composition of the present embodiment, it is preferable from a viewpoint of reducing environmental burden and imparting flame retardance that at least 70 mass % of the organophosphorus flame retardant (D) is composed by at least one compound selected from the group consisting of triphenyl phosphate and a phosphazene.

Among triphenyl phosphate and the phosphazene, the phosphazene is preferable as the organophosphorus flame retardant (D) from a viewpoint of more easily obtaining the effects disclosed herein.

In a situation in which triphenyl phosphate is used individually as the organophosphorus flame retardant (D), the content of triphenyl phosphate among a total mass of 100 mass % of the polyphenylene ether (A), the styrene resin (B), the glass fiber (C), and the organophosphorus flame retardant (D) is preferably from 5 mass % to 13 mass % from a viewpoint of sufficiently obtaining the effects disclosed herein, and is more preferably from 5 mass % to 10 mass % from a viewpoint of increasing heat resistance.

The phosphazene can be a compound that includes the configurational unit in general formula (3) shown below.

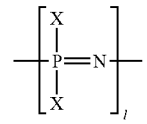

(In general formula (3), X represents Ph (phenyl group) or OPh (phenyloxy group).)

No limitations are placed on the phosphazene other than including the constitutional unit in general formula (3) and the phosphazene may for example be a cyclic phosphazene compound, a chain phosphazene compound, or a crosslinked phosphazene compound that is crosslinked by crosslinking groups.

In the resin composition of the present embodiment, the phosphazene is preferably a cyclic phosphazene compound, and more preferably a cyclic phenoxyphosphazene compound from a viewpoint of imparting better flame retardance. Furthermore, from a viewpoint of molding processability and flame retardance, it is preferable that the phosphazene is a cyclic phenoxyphosphazene compound that contains at least 70 mass % of a trimer, and more suitably at least 85 mass % of a trimer.

In a situation in which the phosphazene is used individually as the organophosphorus flame retardant (D), the content of the phosphazene among a total mass of 100 mass % of the polyphenylene ether (A), the styrene resin (B), the glass fiber (C), and the organophosphorus flame retardant (D) is not specifically limited other than being from 5 mass % to 20 mass % as previously described.

Less than 30 mass % of the organophosphorus flame retardant (D) may be composed by a compound other than triphenyl phosphate and the phosphazene. The other compound may for example be an aromatic phosphoric acid ester other than triphenyl phosphate.

Preferable examples of aromatic phosphoric acid esters that can be used include, but are not limited to, triphenyl substituted-type aromatic phosphoric acid esters such as triphenyl phosphate, tricresyl phosphate, trixylenyl phosphate, cresyl diphenyl phosphate, xylenyl diphenyl phosphate, dixylenyl phenyl phosphate, hydroxy non-bisphenol phosphate, resorcinol bisphosphate, and bisphenol A bisphosphate. Among these aromatic phosphoric acid esters, triphenyl phosphate is more preferable.

In a situation in which a mixture of an aromatic phosphoric acid ester and a phosphazene is used as the organophosphorus flame retardant (D) in the resin composition of the present embodiment, the aromatic phosphoric acid ester and the phosphazene are preferably used together with a mass ratio of from 5:95 to 30:70, more preferably from 10:90 to 25:75, and even more preferably from 20:80 to 25:75 from a viewpoint of imparting better molding fluidity and mechanical properties.

—Other Materials—

The resin composition of the present embodiment may contain a stabilizer, such as an antioxidant, an ultraviolet absorber, or a heat stabilizer, a colorant, a mold release agent, or the like to the extent that mechanical properties, flame retardance, molded article surface external appearance, and so forth are not significantly reduced as a result.

When the total mass of the polyphenylene ether (A), the styrene resin (B), the glass fiber (C), and the organophosphorus flame retardant (D) is taken to be 100 mass %, the content of each of the antioxidant and so forth is preferably at least 0.001 mass %, more preferably at least 0.01 mass %, and even more preferably at least 0.2 mass % from a viewpoint of sufficient exhibition of an additive effect, and is preferably no greater than 3 mass %, more preferably no greater than 2 mass %, and even more preferably no greater than 1 mass % from a viewpoint of maintaining the physical properties of the resin composition of the present embodiment.

The resin composition of the present embodiment may contain an inorganic filler other than the glass fiber (C) to the extent that mechanical properties, impact resistance, and flame retardance are not significantly reduced as a result.

Examples of inorganic fillers other than the glass fiber (C) that can be used include, but are not limited to, carbon fiber, mica, talc, glass flake, glass milled fiber (glass fiber that has been pulverized to form a powder), and chlorite.

When the total mass of the polyphenylene ether (A), the styrene resin (B), the glass fiber (C), and the organophosphorus flame retardant (D) is taken to be 100 mass %, the content of the inorganic filler other than the glass fiber (C) is preferably at least 0.5 mass %, and more preferably at least 1 mass %, and is preferably no greater than 10 mass %, and more preferably no greater than 8 mass % from a viewpoint of imparting rigidity and durability.

(Method for Producing Resin Composition)

The resin composition of the present embodiment can be produced by melt-kneading component (A), component (B), component (C), component (D), and any other materials that are added as necessary.

In a situation in which component (D) of the resin composition of the present embodiment is a solid or powder compound at normal temperature that has a melting point of from 35° C. to 60° C., a situation may occur in production of the resin composition in which the component (D) melts and gives rise to adhesive matter in an extruder at a raw material loading inlet or in a raw material feed line near to a barrel, leading to line blockage and interruption of production. In production of the resin composition of the present embodiment, it is preferable that a production method is adopted in which this problem is resolved.

The production method of the resin composition of the present embodiment is preferably, but not limited to, a method in which component (D) and part or all of component (A) are pre-blended to produce a blended product, and the blended product is used as a raw material for the resin composition. In terms of the blending ratio of component (D) and component (A) in the blended product, when the amount of component (D) is taken to be 1, the amount of component (A) is preferably at least 1, more preferably at least 1.5, and particularly preferably at least 2 from a viewpoint of handling during production of the resin composition, and is preferably no greater than 7, more preferably no greater than 6, and particularly preferably no greater than 5 from a viewpoint of avoiding increased complexity that accompanies an increase in the amount of the blended product that is produced.

Production of the blended product containing component (D) and component (A) may for example be performed using a blender having an adjustable stirring speed or a Henschel mixer having an adjustable rotating blade speed, and may be performed while appropriately adjusting conditions such as speed, temperature, and time depending on the properties (solid, powder, etc.) of component (D). However, production of the blended product is not limited to this method.

A twin screw extruder is suitable for use in the method for producing the resin composition of the present embodiment from a viewpoint of enabling stable mass production of the resin composition, and thereby improving production efficiency; however, this is not a limitation.

The twin screw extruder may for example be a ZSK 40MC twin screw extruder (produced by Werner & Pfleiderer, Germany, barrels: 13, screw diameter: 40 mm, L/D=50; screw pattern including kneading discs L (left-handed): 2, kneading discs R (right-handed): 6, and kneading discs N (neutral): 4) In a situation in which this twin screw extruder is used, the melt-kneading may be performed with conditions of a cylinder temperature of from 270° C. to 330° C., a screw rotation speed of from 150 rpm to 450 rpm, and an extrusion rate of from 40 kg/h to 220 kg/h. Alternatively, the twin screw extruder may for example be a TEM58SS twin screw extruder (produced by Toshiba Machine Co., Ltd., barrels: 13, screw diameter: 58 mm, L/D=53; screw pattern including kneading discs L: 2, kneading discs R: 14, and kneading discs N: 2). In a situation in which this twin screw extruder is used, the melt-kneading may be performed with conditions of a cylinder temperature of from 270° C. to 330° C., a screw rotation speed of from 150 rpm to 500 rpm, and an extrusion rate of from 200 kg/h to 600 kg/h. Note that in "L/D" shown above, "L" indicates the screw barrel length of the extruder and "D" indicates the screw barrel diameter of the extruder.

The screw diameter of the twin screw extruder is preferably from 25 mm to 90 mm, and more preferably from 40 mm to 70 mm.

When the resin composition of the present embodiment is produced using the twin screw extruder, it is preferable, from a viewpoint of providing the material with heat resistance and mechanical properties, that component (A), component (B), and component (D) are fed from a feeding inlet at a furthest upstream part of the extruder (top feed) and that component (C) is fed from a feeding inlet partway along the extruder (side feed).

=Physical Properties=

The following describes various physical properties of the resin composition of the present embodiment.

The resin composition of the present embodiment preferably has a tensile strength (measured at 23° C. in accordance with ISO 527) of at least 130 MPa from a viewpoint of maintenance of thin molded article shape during use and prevention of cracking. The tensile strength is preferably at least 135 MPa, and more preferably at least 140 MPa.

The resin composition of the present embodiment preferably has a flexural strength (measured at 23° C. in accordance with ISO 178) of at least 170 MPa from a viewpoint of maintenance of thin molded article shape during use. The flexural strength is more preferably at least 180 MPa, and even more preferably at least 190 MPa.

The resin composition of the present embodiment preferably has a Charpy impact strength (measured at 23° C. in accordance with ISO 179) of at least 7 kJ/m² from a viewpoint of prevention of thin molded article cracking during use under conditions in which external force is applied, such as during rotation of a propeller. The Charpy impact strength is more preferably at least 10 kJ/m².

The resin composition of the present embodiment preferably has a flame retardance level (in accordance with UL 94) of V-0 as measured using a strip specimen of 0.8 mm in thickness from a viewpoint of prevention of fire spreading due to ignition inside a thin molded article-containing device or the like.

The resin composition of the present embodiment preferably has an MFR (measured at 250° C. with a load of 10 kg, in accordance with ISO 1133) of at least 3 g/10 mins from a viewpoint of thin molded article moldability. The MFR is more preferably at least 5 g/10 mins, and even more preferably at least 10 g/10 mins.

The resin composition of the present embodiment preferably has a DTUL (measured by the flatwise method with a load of 1.82 MPa, in accordance with ISO 75) of at least 100° C. from a viewpoint of thin molded article durability during high-temperature use. The DTUL is more preferably at least 125° C., and even more preferably at least 135° C.

The resin composition of the present embodiment preferably has a high-temperature tensile strength (measured at 110° C. in accordance with ISO 527) of at least 70 MPa from a viewpoint of thin molded article durability at high temperatures. The high-temperature tensile strength is more preferably at least 80 MPa.

(Molded Article)

A molded article formed from the resin composition of the present embodiment can be obtained by molding the resin composition described above. The resin composition of the present embodiment is particularly suitable for molding a thin molded article. Herein, the term "thin molded article" refers to a molded article composed completely or partially by a thin portion. The thin portion is defined as a portion having a thickness that is no greater than 3 mm, preferably no greater than 1.5 mm, and even more preferably no greater than 0.75 mm, and that is no greater than $1/20^{th}$ of lengths in two directions perpendicular to the thickness direction, preferably no greater than $1/100^{th}$ of these lengths, and more preferably no greater than $1/500^{th}$ of these lengths.

One preferable example of the molded article is a cooling fan for an electric or electronic device since such a cooling fan is required to have excellent heat resistance, mechanical strength, and thin portion flame retardance.

Examples of preferable methods by which the resin composition can be molded include, but are not limited to, injection molding, extrusion molding, vacuum molding, and pressure molding. Injection molding is particularly preferable from a viewpoint of external appearance characteristics and mass producibility of the molded article.

EXAMPLES

The following explains the present disclosure through specific examples and comparative examples. However, the present disclosure is not limited to the following examples. Raw materials and measurement methods of physical properties used for resin compositions in the examples and comparative examples were as follows.

(Raw Materials)

—Polyphenylene Ether (A)—

PPE 1: Poly(2,6-dimethyl-1,4-phenylene) ether having a reduced viscosity of 0.40 dL/g (measured at 30° C. using chloroform solvent)

PPE 2: Poly(2,6-dimethyl-1,4-phenylene) ether having a reduced viscosity of 0.31 dL/g (measured at 30° C. using chloroform solvent)

—Polystyrene (B)—

GPPS 1: General purpose polystyrene (product name: Styron® 660 (Styron is a registered trademark in Japan, other countries, or both), produced by The Dow Chemical Company, United States of America)

—Glass Fiber (C)—

GF 1: Glass fiber surface treated with an aminosilane compound and having an average fiber diameter of 10 μm and a fiber cut length of 3 mm (product name: EC10 3MM 910® (EC10 3MM 910 is a registered trademark in Japan, other countries, or both), produced by NSG Vetrotex)

—Flame Retardant (D)—

FR 1: Triphenyl phosphate (aromatic phosphoric acid ester flame retardant, product name: TPP® (TPP is a registered trademark in Japan, other countries, or both), produced by Daihachi Chemical Industry Co., Ltd.)

FR 2: Bisphenol A bisdiphenyl phosphate (aromatic phosphoric acid ester flame retardant, product name: CR-741® (CR-741 is a registered trademark in Japan, other countries, or both), produced by Daihachi Chemical Industry Co., Ltd.)

FR 3: Phosphonitrilic acid phenyl ester (phosphazene flame retardant, product name: Rabitle® FP-110 (Rabitle is a registered trademark in Japan, other countries, or both), produced by Fushimi Pharmaceutical Co., Ltd.)

—Other Materials—

Mica: Product name: C-1001F® (C-1001F is a registered trademark in Japan, other countries, or both), produced by Repco Inc.

Phosphinic acid metal salt flame retardant: Product name: Exolit OP930® (Exolit OP930 is a registered trademark in Japan, other countries, or both), produced by Clariant (Japan) K.K.

(Measurement Methods of Physical Properties)

(1) Tensile Strength

Pellets of the resin composition produced in each of the following examples and comparative examples were dried in a hot-air dryer for 1 hour at 90° C. An injection molding machine (IS-80EPN, produced by Toshiba Machine Co., Ltd.) equipped with an ISO physical property specimen mold was used to mold the dried resin composition with settings of a cylinder temperature of 300° C., a mold temperature of 90° C., an injection pressure of 50 MPa (gauge pressure), an injection speed of 200 mm/sec, and an injection time/cooling time of 20 secs/20 secs in order to form a dumbbell molded piece as an ISO 3167, type A multipurpose specimen. The dumbbell molded piece prepared as the type A multipurpose specimen was used in order to measure the tensile strength at 23° C. in accordance with ISO 527. In terms of evaluation criteria, a higher measured value was determined to indicate better mechanical properties and, in particular, a measured value of 130 MPa or greater was determined to be preferable for the resin composition of the present embodiment.

(2) Flexural Strength

A dumbbell molded piece prepared as an ISO 3167, type A multipurpose specimen as described in (1) was cut in order to prepare a molded piece of 80 mm×10 mm×4 mm. The specimen was used in order to measure the flexural strength at 23° C. in accordance with ISO 178. In terms of evaluation criteria, a higher measured value was determined to indicate better mechanical properties and, in particular, a measured value of 170 MPa or greater was determined to be preferable for the resin composition of the present embodiment.

(3) Charpy Impact Strength

A dumbbell molded piece prepared as an ISO 3167, type A multipurpose specimen as described in (1) was cut in order to prepare a molded piece of 80 mm×10 mm×4 mm. The specimen was used in order to measure the Charpy impact strength at 23° C. in accordance with ISO 179. In terms of evaluation criteria, a higher measured value was determined to indicate better impact resistance.

(4) Thin Portion Flame Retardance

A molded strip of 0.8 mm in thickness was measured based on the UL 94 test method and the flame retardance level was determined. In particular, a flame retardance level of V-0 was determined to be preferable for the resin composition of the present embodiment.

(5) Molding Fluidity (MFR)

Pellets of the resin composition produced in each of the following examples and comparative examples were dried in a hot-air dryer for 1 hour at 90° C. The MFR (melt flow rate) of the dried resin composition was measured using a melt indexer (P-111 produced by Toyo Seiki Seisaku-Sho, Ltd.) with a cylinder temperature setting of 250° C. and a load of 10 kg. In terms of evaluation criteria, a higher measured value was determined to indicate better molding fluidity.

(6) Deflection Temperature Under Load (DTUL)

A dumbbell molded piece prepared as an ISO 3167, type A multipurpose specimen as described in (1) was cut in order to prepare a molded piece of 80 mm×10 mm×4 mm. The specimen was used in order to measure the deflection temperature under load (DTUL) at 1.82 MPa by the flatwise method in accordance with ISO 75. In terms of evaluation criteria, a higher value for the DTUL was determined to indicate better heat resistance.

(7) High-Temperature Tensile Strength

A dumbbell molded piece prepared as an ISO 3167, type A multipurpose specimen as described in (1) was used to measure the tensile strength at 110° C. in accordance with ISO 527. In terms of evaluation criteria, a higher measured value was determined to indicate better high-temperature durability and, in particular, a measured value of 60 MPa or greater was determined to be preferable for the resin composition of the present embodiment.

The following describes each of the examples and comparative examples in detail.

Example 1

In Example 1, 34 parts by mass of PPE 1 and 36 parts by mass of a blended product obtained by pre-stirring and mixing of FR 1 and PPE 1 in a 1/3 ratio using a Henschel mixer (rotation speed 600 rpm, stirring time 1 min, internal temperature 23° C. to 25° C.) were fed from a furthest upstream section (top feed) of a ZSK 40MC twin screw extruder, produced by Werner & Pfleiderer, Germany, having 13 barrels and a screw diameter of 40 mm (screw pattern including kneading discs L: 2, kneading discs R: 6, and kneading discs N: 4), and 30 parts by mass of GF 1 was side fed from barrel 8 partway along the extruder. Melt-kneading was carried out at a cylinder temperature of 300° C., a screw rotation speed of 250 rpm, and an extrusion rate of 100 kg/h to obtain a resin composition. The test results of physical properties of the resin composition are as shown in Table 1.

Example 2

In Example 2, 25 parts by mass of PPE 1 and 45 parts by mass of a blended product obtained by pre-stirring and mixing FR 1 and PPE 1 in a 1/2 ratio using a Henschel mixer (rotation speed 600 rpm, stirring time 1 min, internal temperature 23° C. to 27° C.) were fed from the furthest upstream section (top feed) of the ZSK 40MC twin screw extruder used in Example 1, and 30 parts by mass of GF 1 was side fed from barrel 8 partway along the extruder. Melt-kneading was carried out at a cylinder temperature of 300° C., a screw rotation speed of 250 rpm, and an extrusion rate of 100 kg/h to obtain a resin composition. The test results of physical properties of the resin composition are as shown in Table 1.

Example 3

In Example 3, 25 parts by mass of PPE 2 and 30 parts by mass of a blended product obtained by pre-stirring and mixing FR 1 and PPE 2 in a 1/1 ratio using a Henschel mixer (rotation speed 500 rpm, stirring time 1.5 mins, internal temperature 27° C. to 30° C.) were fed from the furthest upstream section (top feed) of the ZSK 40MC twin screw extruder used in Example 1, and 45 parts by mass of GF 1 was side fed from barrel 8 partway along the extruder. Melt-kneading was carried out at a cylinder temperature of 300° C., a screw rotation speed of 250 rpm, and an extrusion rate of 100 kg/h to obtain a resin composition. The test results of physical properties of the resin composition are as shown in Table 1.

Example 4

In Example 4, 22 parts by mass of PPE 1, 45 parts by mass of a blended product obtained by pre-stirring and mixing FR 1 and PPE 1 in a 1/2 ratio using a Henschel mixer (rotation speed 600 rpm, stirring time 1 min, internal temperature 23° C. to 27° C.), and 3 parts by mass of GPPS 1 were fed from the furthest upstream section (top feed) of the ZSK 40MC twin screw extruder used in Example 1, and 30 parts by mass of GF 1 was side fed from barrel 8 partway along the extruder. Melt-kneading was carried out at a cylinder temperature of 300° C., a screw rotation speed of 250 rpm, and an extrusion rate of 100 kg/h to obtain a resin composition. The test results of physical properties of the resin composition are as shown in Table 1.

Example 5

In Example 5, 56 parts by mass of PPE 1 and 14 parts by mass of FR 3 were fed from the furthest upstream section (top feed) of the ZSK 40MC twin screw extruder used in Example 1, and 30 parts by mass of GF 1 was side fed from barrel 8 partway along the extruder. Melt-kneading was carried out at a cylinder temperature of 300° C., a screw rotation speed of 250 rpm, and an extrusion rate of 100 kg/h to obtain a resin composition. The test results of physical properties of the resin composition are as shown in Table 1.

Example 6

In Example 6, 56 parts by mass of PPE 1, 10.5 parts by mass of FR 3, and 3.5 parts by mass of FR 2 were fed from the furthest upstream section (top feed) of the ZSK 40MC twin screw extruder used in Example 1, and 30 parts by mass of GF 1 was side fed from barrel 8 partway along the extruder. Melt-kneading was carried out at a cylinder temperature of 300° C., a screw rotation speed of 250 rpm, and an extrusion rate of 100 kg/h to obtain a resin composition.

The test results of physical properties of the resin composition are as shown in Table 1.

Comparative Example 1

In Comparative Example 1, 18 parts by mass of PPE 1, 45 parts by mass of a blended product obtained by pre-stirring and mixing FR 1 and PPE 1 in a 1/2 ratio using a Henschel mixer (rotation speed 600 rpm, stirring time 1 min, internal temperature 23° C. to 27° C.), and 7 parts by mass of GPPS 1 were fed from the furthest upstream section (top feed) of the ZSK 40MC twin screw extruder used in Example 1, and 30 parts by mass of GF 1 was side fed from barrel 8 partway along the extruder. Melt-kneading was carried out at a cylinder temperature of 300° C., a screw rotation speed of 250 rpm, and an extrusion rate of 100 kg/h to obtain a resin composition. The test results of physical properties of the resin composition are as shown in Table 1.

Comparative Example 2

In Comparative Example 2, 52 parts by mass of PPE 1 was fed from the furthest upstream section (top feed) of the ZSK 40MC twin screw extruder used in Example 1, 18 parts by mass of FR 2 was added as a liquid from barrel 4 partway along the extruder, and 30 parts by mass of GF 1 was side fed from barrel 8 partway along the extruder. Melt-kneading was carried out at a cylinder temperature of 300° C., a screw rotation speed of 250 rpm, and an extrusion rate of 100 kg/h to obtain a resin composition. The test results of physical properties of the resin composition are as shown in Table 1.

Comparative Example 3

In Comparative Example 3, 56 parts by mass of PPE 1, 7 parts by mass of FR 3, and 7 parts by mass of FR 2 were fed from the furthest upstream section (top feed) of the ZSK 40MC twin screw extruder used in Example 1, and 30 parts by mass of GF 1 was side fed from barrel 8 partway along the extruder. Melt-kneading was carried out at a cylinder temperature of 300° C., a screw rotation speed of 250 rpm, and an extrusion rate of 100 kg/h to obtain a resin composition. The test results of physical properties of the resin composition are as shown in Table 1.

Comparative Example 4

In Comparative Example 4, 51 parts by mass of PPE 1 and 4 parts by mass of a phosphinic acid metal salt flame retardant (product name: Exolit OP 930, produced by Clariant (Japan) K.K.) were fed from the furthest upstream section (top feed) of the ZSK 40MC twin screw extruder used in Example 1, 15 parts by mass of FR 2 was added as a liquid from barrel 4 partway along the extruder, and 30 parts by mass of GF 1 was side fed from barrel 8 partway along the extruder. Melt-kneading was carried out at a cylinder temperature of 300° C., a screw rotation speed of 250 rpm, and an extrusion rate of 100 kg/h to obtain a resin composition. The test results of physical properties of the resin composition are as shown in Table 1.

Comparative Example 5

In Comparative Example 5, 50 parts by mass of PPE 1, 10 parts by mass of FR 1, and 30 parts by mass of mica (product name: C-1001F®, produced by Repco Inc.) were fed from the furthest upstream section (top feed) of the ZSK 40MC twin screw extruder used in Example 1, and 10 parts by mass of GF 1 was side fed from barrel 8 partway along the extruder. Melt-kneading was carried out at a cylinder temperature of 300° C., a screw rotation speed of 250 rpm, and an extrusion rate of 100 kg/h to obtain a resin composition. The test results of physical properties of the resin composition are as shown in Table 1.

Comparative Example 6

In Comparative Example 6, 35 parts by mass of PPE 2 and 10 parts by mass of FR 1 were fed from the furthest upstream section (top feed) of the ZSK 40MC twin screw extruder used in Example 1, and 55 parts by mass of GF 1 was side fed from barrel 8 partway along the extruder. Melt-kneading was carried out at a cylinder temperature of 300° C., a screw rotation speed of 250 rpm, and an extrusion rate of 100 kg/h to obtain a resin composition. The test results of physical properties of the resin composition are as shown in Table 1.

TABLE 1

| | | | | Example 1 | Example 2 | Example 3 | Example 4 | Example 5 | Example 6 |
|---|---|---|---|---|---|---|---|---|---|
| Composition | Component (A) | PPE 1 | η 0.40 | 61 | 55 | — | 52 | 56 | 56 |
| | Component (A) | PPE 2 | η 0.31 | — | — | 40 | — | — | — |
| | Component (B) | GPPS 1 | 660 | — | — | — | 3 | — | — |
| | Component (C) | GF 1 | 10μ diameter | 30 | 30 | 45 | 30 | 30 | 30 |
| | Other materials | Mica | | — | — | — | — | — | — |
| | Component (D) | FR 1 | TPP | 9 | 15 | 15 | 15 | — | — |
| | Component (D) | FR 2 | CR-741 | — | — | — | — | — | 3.5 |
| | Component (D) | FR 3 | Rabitle FP-110 | — | — | — | — | 14 | 10.5 |
| | Other materials | Phosphinic acid metal salt flame retardant | Exolit OP 930 | — | — | — | — | — | — |
| | | Total of (A) to (D) | | 100 | 100 | 100 | 100 | 100 | 100 |
| Physical properties | | Tensile strength | MPa | 142 | 135 | 162 | 135 | 147 | 152 |
| | | Flexural strength | MPa | 195 | 184 | 240 | 180 | 220 | 234 |

TABLE 1-continued

| | | | Ex. 1 | Ex. 2 | Ex. 3 | Ex. 4 | Ex. 5 | Ex. 6 |
|---|---|---|---|---|---|---|---|---|
| | Charpy impact strength | kJ/m² | 10.2 | 11.8 | 14.2 | 11.3 | 14.5 | 12.5 |
| | Flame retardance level | 0.8 mm | V-0 | V-0 | V-0 | V-0 | V-0 | V-0 |
| | MFR (250/10) | g/10 mins | 7.4 | 25 | 32 | 28 | 5.6 | 8.9 |
| | DTUL | °C. | 145 | 117 | 104 | 113 | 150 | 151 |
| | High-temperature tensile strength | MPa | 83 | 50 | 22 | 36 | 95 | 102 |

| | | | | Comparative Example 1 | Comparative Example 2 | Comparative Example 3 | Comparative Example 4 | Comparative Example 5 | Comparative Example 6 |
|---|---|---|---|---|---|---|---|---|---|
| Composition | Component (A) | PPE 1 | η 0.40 | 48 | 52 | 56 | 51 | 50 | — |
| | Component (A) | PPE 2 | η 0.31 | — | — | — | — | — | 35 |
| | Component (B) | GPPS 1 | 660 | 7 | — | — | — | — | — |
| | Component (C) | GF 1 | 10μ diameter | 30 | 30 | 30 | 30 | 10 | 55 |
| | Other materials | Mica | | — | — | — | — | 30 | — |
| | Component (D) | FR 1 | TPP | 15 | — | — | — | 10 | 10 |
| | Component (D) | FR 2 | CR-741 | — | 18 | 7 | 15 | 0 | 0 |
| | Component (D) | FR 3 | Rabitle FP-110 | — | — | 7 | — | — | — |
| | Other materials | Phosphinic acid metal salt flame retardant | Exolit OP 930 | — | — | — | 4 | — | — |
| Physical properties | Total of (A) to (D) | | | 100 | 100 | 100 | 96 | 70 | 100 |
| | Tensile strength | MPa | | 116 | 126 | 130 | 95 | 70 | 165 |
| | Flexural strength | MPa | | 172 | 185 | 188 | 144 | 115 | 220 |
| | Charpy impact strength | kJ/m² | | 9.3 | 8.0 | 9.7 | 4.1 | 3.1 | 17.5 |
| | Flame retardance level | 0.8 mm | | V-1 | V-1 | V-1 | V-0 | V-0 | V-1 |
| | MFR (250/10) | g/10 mins | | 19 | 20 | 14.2 | 5.5 | 5.7 | 11.6 |
| | DTUL | °C. | | 92 | 123 | 134 | 126 | 134 | 129 |
| | High-temperature tensile strength | MPa | | 8 | 53 | 65 | 46 | 38 | 98 |

The results in Table 1 show that the resin compositions of Examples 1-6 each had a tensile strength of at least 130 MPa, an excellent flame retardance level of V-0, and good other physical properties. In particular, the aforementioned physical properties of the resin composition of Example 1 were further improved as a result of triphenyl phosphate being used as component (D) and the content thereof in the composition being stipulated. Moreover, the aforementioned physical properties of the resin composition of Example 5 were further improved as a result of a phosphazene being used as component (D). Furthermore, the aforementioned physical properties of the resin composition of Example 6 were further improved as a result of a mixture of an aromatic phosphoric acid ester and a phosphazene being used as component (D) and the content of the phosphazene among component (D) being stipulated.

In contrast, physical properties such as described above were not obtained in Comparative Examples 1-6. In Comparative Example 1 in which the content of component (B) exceeded the range described in claim 1, the tensile strength and flame retardance level were poor compared to the examples. Moreover, in Comparative Examples 2-4 in which the content of at least one compound selected from the group consisting of triphenyl phosphate and a phosphazene did not satisfy the stipulations of claim 1, effects complying with the present application were not obtained. Specifically, compared to the examples, Comparative Example 2 had a poor flame retardance level, Comparative Example 3 had a poor flame retardance level, and Comparative Example 4 had a poor tensile strength. In Comparative Example 5 in which the content of component (C) was below the range described in claim 1, mechanical properties were poor compared to the examples. Moreover, in Comparative Example 6 in which the content of component (C) exceeded the range described in claim 1, the flame retardance level was poor compared to the examples.

INDUSTRIAL APPLICABILITY

Through the presently disclosed polyphenylene ether resin composition, it is possible to provide a polyphenylene ether resin composition that has excellent flame retardance, molding fluidity, and mechanical properties such as tensile strength, flexural strength, and impact strength. The polyphenylene ether resin composition can be used particularly effectively as a thin molded article for a cooling fan or the like of an electric or electronic device. Moreover, the presently disclosed molded article enables the effects of the presently disclosed polyphenylene ether resin composition to be obtained. Furthermore, the presently disclosed method for producing a polyphenylene ether resin composition enables production of the presently disclosed polyphenylene ether resin composition.

The invention claimed is:

1. A polyphenylene ether resin composition comprising at least 90 mass % of a polyphenylene ether (A), glass fiber (C), and an organophosphorus flame retardant (D) in terms of a total mass of (A), (C), and (D), wherein
a styrene resin is not included,
when the total mass of (A), (C), and (D) is taken to be 100 mass %, content of the polyphenylene ether (A) is from 25 mass % to 75 mass %, content of the glass fiber (C) is from 20 mass % to 50 mass %, and content of the organophosphorus flame retardant (D) is from 5 mass % to 20 mass %,
at least 70 mass % of the organophosphorus flame retardant (D) is at least one compound selected from the group consisting of triphenyl phosphate and a phosphazene,
the polyphenylene ether resin composition has a high-temperature tensile strength of at least 70 MPa as measured at 110° C. in accordance with ISO 527, and a flame retardance level of V-0 as measured in accordance with UL 94 using a strip specimen of 0.8 mm in thickness.

2. The polyphenylene ether resin composition of claim 1 having a tensile strength of at least 130 MPa as measured at 23° C. in accordance with ISO 527.

3. The polyphenylene ether resin composition of claim 1 having a flexural strength of at least 170 MPa as measured at 23° C. in accordance with ISO 178.

4. The polyphenylene ether resin composition of claim 1, wherein a ratio of a weight average molecular weight of the polyphenylene ether (A) and a number average molecular weight of the polyphenylene ether (A) is at least 2.0 and no greater than 5.5.

5. The polyphenylene ether resin composition of claim 1, wherein a reduced viscosity of the polyphenylene ether (A) is at least 0.25 dL/g and no greater than 0.65 dL/g.

6. The polyphenylene ether resin composition of claim 1, wherein an average L/D ratio of the glass fiber (C) is at least 70 and no greater than 1,200.

7. The polyphenylene ether resin composition of claim 1, wherein
the organophosphorus flame retardant (D) is triphenyl phosphate and, when the total mass of (A) to (D) is taken to be 100 mass %, content of the triphenyl phosphate is from 5 mass % to 13 mass %.

8. The polyphenylene ether resin composition of claim 1, wherein
the organophosphorus flame retardant (D) is a phosphazene.

9. The polyphenylene ether resin composition of claim 1, wherein
the organophosphorus flame retardant (D) is a mixture of an aromatic phosphoric acid ester and a phosphazene and, when a mass of the organophosphorus flame retardant (D) is taken to be 100 mass %, content of the phosphazene is from 70 mass % to 95 mass %.

10. A method for producing the polyphenylene ether resin composition of claim 1, comprising:
obtaining a blended product by pre-blending the organophosphorus flame retardant (D) and the polyphenylene ether (A) in a ratio (D)/(A) of from 1/1 to 1/7; and
kneading the blended product and the glass fiber (C) to produce the polyphenylene ether resin composition of claim 1.

11. A cooling fan for an electric or electronic device comprising the polyphenylene ether resin composition of claim 1 comprising a thin portion having a thickness of no greater than 3 mm.

* * * * *